Nov. 11, 1952 — C. T. SMITS — 2,617,557
POTATO PLANTING MACHINE
Filed June 21, 1949 — 4 Sheets-Sheet 1

Inventor:
Christianus Theodorus Smits
By Robert E. Burns
Attorney

Nov. 11, 1952 C. T. SMITS 2,617,557
POTATO PLANTING MACHINE
Filed June 21, 1949 4 Sheets-Sheet 2

Inventor:
Christianus Theodorus Smits
By Robert E. Burn
Attorney

Nov. 11, 1952 C. T. SMITS 2,617,557

POTATO PLANTING MACHINE

Filed June 21, 1949 4 Sheets-Sheet 3

Inventor:
Christianus Theodorus Smits
By Robert E. Burns
Attorney

Nov. 11, 1952     C. T. SMITS     2,617,557

POTATO PLANTING MACHINE

Filed June 21, 1949     4 Sheets-Sheet 4

Inventor:
Christianus Theodorus Smits
By Robert E. Burns
Attorney

Patented Nov. 11, 1952

2,617,557

UNITED STATES PATENT OFFICE 2,617,557

POTATO PLANTING MACHINE

Christianus Theodorus Smits, Borkel and Schaft, Netherlands

Application June 21, 1949, Serial No. 100,398
In the Netherlands June 26, 1948

24 Claims. (Cl. 222—13)

The invention relates to a potato planting machine.

The known machines for this purpose are complicated and expensive. In general, they require an operator for each planting row for which the machine is intended. Moreover, the operation of these machines is often irregular, so that it may happen that two or more potatoes are planted at the same time, or that a planting spot is passed over.

It is an object of the invention to provide a potato planting machine of relatively simple and inexpensive construction. Another object of the invention is to provide a potato planting machine adapted to plant potatoes simultaneously in a plurality of rows without requiring a separate operator for each row.

Still another object of the invention is to provide a potato planting machine with a substantially regular operation, which deposits one potato in every planting spot without skipping any such spots.

A further object of the invention is to provide a potato planting machine which is adapted to plant potatoes of different sizes without preliminary sorting.

A still further object of the invention is to provide a potato planting machine with a feeler detecting a failure whereby a planting spot would be skipped and controlling a stand-by device which supplies an additional potato for such a planting spot.

Other objects of the invention, and the exact nature thereof, will be apparent from the following description of some embodiments of the invention, given with reference to the accompanying drawings.

In the drawings, 1 indicates a storage tank for potatoes, which has been mounted together with the remaining parts of the device on a frame 2. The frame has only partially been shown, and may form a part of a self-contained agricultural vehicle, to be propelled by horse- or motor-traction. However, the potato planting device may also have the shape of a two-wheeled assembly, to be hooked on to an agricultural implement, such as a plough or a furrower. Furthermore, it will be clear that the potato planting device may be combined in the usual way with other tilling apparatus, such as the above mentioned furrower. Sowing pipes which are shaped as furrowers per se may be applied for leading the seed-potato into the furrow, the apparatus may be combined with means for closing the furrow, and other similar combinations are possible.

Under the storage tank, a regulating disc 3 has been provided, by means of which the supply of potatoes to a vibrating conveyor 4 is controlled. This vibrating conveyor is actuated, for instance, by the axle of the wheels 25 which support the frame. This has been schematically indicated in Fig. 2 by an arm 30, which is connected with the conveyor and is supported at its free end by a roller 5, fixedly keyed to the axle 6. This roller is provided with an irregular surface, whereby the arm 30 is actuated upon movement of the axle 6. The said irregularity of the surface may consist of a fluting or of a groove in which a cam or roller of the arm 30 is running. This has been indicated in the drawings by a zigzag line on the roller 5. For that matter, the above-mentioned parts have only been schematically shown, because they are known per se in various forms.

At its discharge end 30', the vibrating conveyor 4 passes into two troughs 31 and 32, sloping to the left and to the right, respectively and ending in funnel shaped parts 33 and 34. Each of these funnels has a slot 8, or 8' respectively, in its side wall, which extends to the bottom openings 35 and 36 of the funnels.

Figure 2:
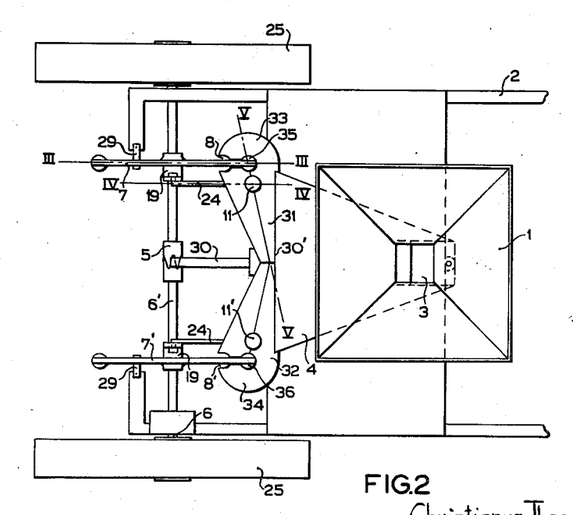
Fig. 2 is an appertaining plan view.

A spindle 6' lies above the axle 6, and is driven by the axle with the aid of a gearing 37, 38. For instance, the spindle 6' may perform four revolutions for each revolution of the axle. Two levers 7 and 7' with equal arms are fixedly arranged on the spindle 6', and provided at each end with a pinning-up needle 10 for the potatoes, projecting in the direction of rotation (cf. Fig. 3). The path of the needles 10 of each arm 7, 7' leads through the middle of the bottom hole of a funnel. Thus, the needle 10 of the arm 7 passes through the funnel 9. The slot 8 in this funnel serves for passing the arm 7. As potatoes are regularly supplied to the funnel 9 by the feeding device 4, 31, so that there is always a potato lying in a centered position in the bottom hole 35 of the funnel 9, this potato is pinned up on the needle 10 in passing. The potato is then led upwards through the funnel by the arm 7 and the needle 10, which may be indicated together as a "potato picker." The bottom part of the slot 8 has been widened at the point where the needle passes through the slot, as shown in Fig. 2 so that the pinned-up potato may pass through the slot at this point. It will be clear that the bottom opening 35 must be so narrow that the smallest potatoes used as seed-potatoes do not drop through this hole.

Preferably, the needle is so long and so thin that it penetrates at least to the centre of the potato on pinning up a seed-potato of mean size.

Figure 1:
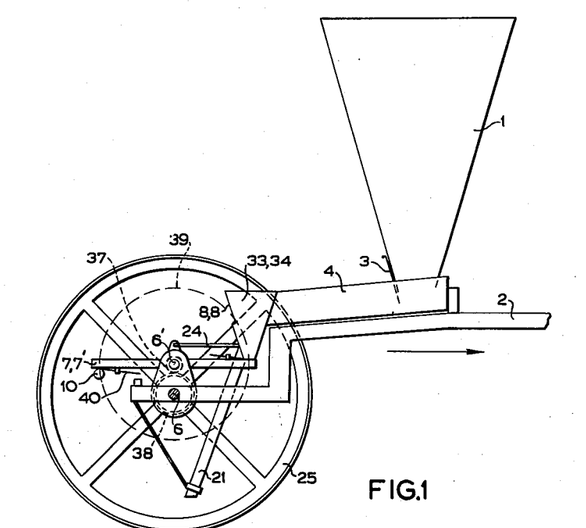
Fig. 1 is a side view of a potato planting machine according to the invention.

The pinned-up potato describes the path shown by the dotted line 39 in Fig. 1.

Now, the potato must drop from the needle into the planting furrow or into a sowing pipe leading to the planting furrow at a point of the path opposite to the funnel opening 35. However, the natural weight of the potato is not sufficient for this purpose, and that is why a wiping-off device has been provided for each needle.

Figure 3:
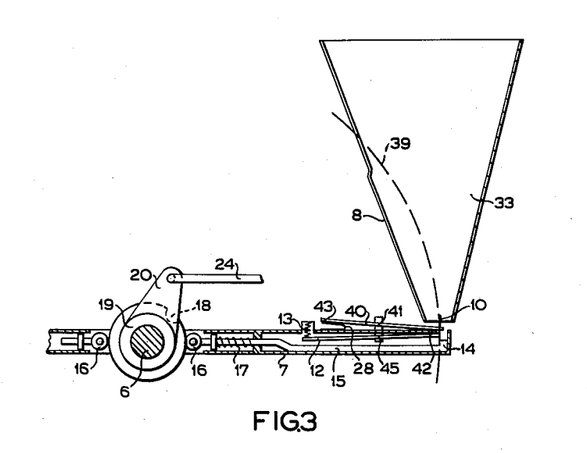
Fig. 3 is a cross section on an enlarged scale, taken along the line III—III of Fig. 2.

As shown in Fig. 3, a double-armed lever 40, rotatable about a shaft 41, has been provided at each needle. By means of a spring blade 28, this lever is normally kept in the position, wherein the wiping-off end 42 of the lever 40 lies at the foot of the needle 10. In the opposite part of the path 39, a resilient striker 29, fixedly attached to the frame, projects into this path. This resilient striker may be constituted, for instance of a rubber strip, and it is arranged in such a point that the end 43 of the wiping-off lever 40 runs up against the striker when the arm 7 passes. Thus, the end 43 is pressed against the arm 7, and the wiping-off end 42 wipes the potato from the needle 10. Upon continued rotation of the arm 7, the strip 29 is pressed down and to the side, and after the arm has passed, the strip jumps back into its former position. The potato picker 7', running through the funnel 8', operates in a similar manner.

It will be clear that the planting machine may be provided, if desired, with additional potato pickers and associated funnels, so that potatoes may be planted in more than two furrows lying side by side. The feeding device supplying the potatoes to the funnels will have to be carried out in multiple in this case, in accordance with the number of potato pickers.

If the speed of rotation of the potato picker and the reaction velocity of the parts cooperating therewith are adapted to this purpose, it is also conceivable to provide the potato picker with additional arms describing the same path and passing through the same funnel; for instance, four arms may be used, including angles of 90° between them.

The above-described device may be extended in a simple manner with a stand-by device for increasing the security that no planting spots are skipped in the planting furrow. This is because the supply of potatoes through the vibrating conveyor 4 and the troughs 31 and 32 to the funnels 33 and 34 must proceed so regularly that the potatoes slide to the funnel as a layer, and that only one or a few potatoes are in the funnel at each time. By jerks of the vehicle due to the irregular surface of the field, or by other causes, an irregularity in this supply may sometimes occur, so that no potato is pinned up on the needle 10 at the desired moment. Now, an additional opening 11, or 11' respectively has been provided in each of the troughs 31 and 32. An annular sliding member 44 is provided under each opening (cf. Figs. 4 and 5). This sliding member will therefore always contain one potato, whilst the supply to the funnel opening 35 is continued interruptedly: these potatoes simply roll over and along the potato in the sliding member 44. A spring 23 is attached with one end to a sowing pipe 21, fixedly connected with the frame of the machine, and with its other end to the operating rod 24 of the sliding member 44. This spring tends to keep the sliding member always in the position below the opening 11. If the rod 24 is drawn to the left, the sliding member brings the potato contained therein above the sowing pipe 21, and the potato rolls through the sowing pipe to the planting spot. The rod 24 is operated by an arm 20, fixedly attached to a bush 19, which is rotatable about the spindle 6'. As shown in Fig. 3, the needle 10 has been placed on a separate double-armed lever 12, rotatably connected with the arm 7 in a point 45. By means of a spring 13, the needle is normally kept in the upper position, but when a potato has been pinned up on the needle, the end is pressed down by the weight of the potato against the action of the light spring 13. In this position, a cam 14 on an arm 15 is kept locked. A spring 17 always tends to move the arm 15 to the left, but this arm is provided at its left-hand end with a roller 16, rolling along the circumference of the bush 19. In order to accommodate these parts, the arm 7 has been carried out hollow. When the arm 7 moves further upwards in its path 39, the roller 16 reaches a notch 18 in the bush 19. If, at that moment, the cam 14 is in the above-described locking position, i. e. if the needle 10 has pinned up a potato, the roller 16 just passes the notch 18 without anything particular happening. However, if no potato has been pinned up, the needle 10 has remained in its upper position and the cam 14 has therefore remained unlocked. In this case, the roller 16 jumps into the recess 18, and the bush 19 with the arm 20 is taken along, whereby the arm 24 is drawn to the left until the sliding member 44 strikes against the wall 46 of the upper mouth of the sowing pipe. Thus, a potato rolls into the sowing pipe 21. After the sliding member 44 has been stopped, the roller 16 again leaves the notch 18, and the spring 23 draws the rod 24 and the arm 20 back into the zero position, in which a next potato can roll into the sliding member 44.

The diameter of the wheels 25, the transmission ratio between the axle 6 and the spindle 6', the length of the rotating arm 7, and the length and direction of the sowing pipe 21 may be so chosen with respect to each other that the potato, on leaving the lower end of the sowing pipe comes to rest in the same spot where the potato which ought to have been pinned up by the needle 10 would have landed.

Figure 4:
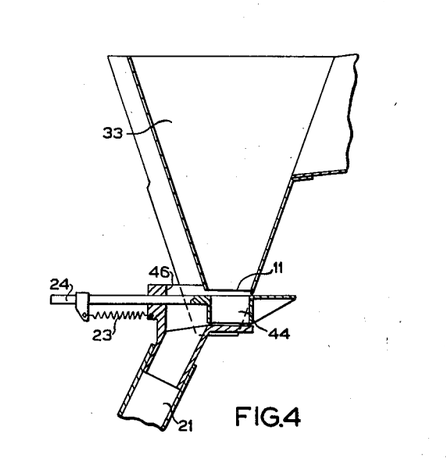
Fig. 4 is a detailed cross-section, likewise on an enlarged scale taken along the line IV—IV of Fig. 2 and showing the stand-by device.
Figure 5:
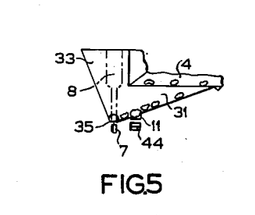
Fig. 5 is a cross-section on a smaller scale, taken along the line V—V of Fig. 2.
Figures 6, 10:
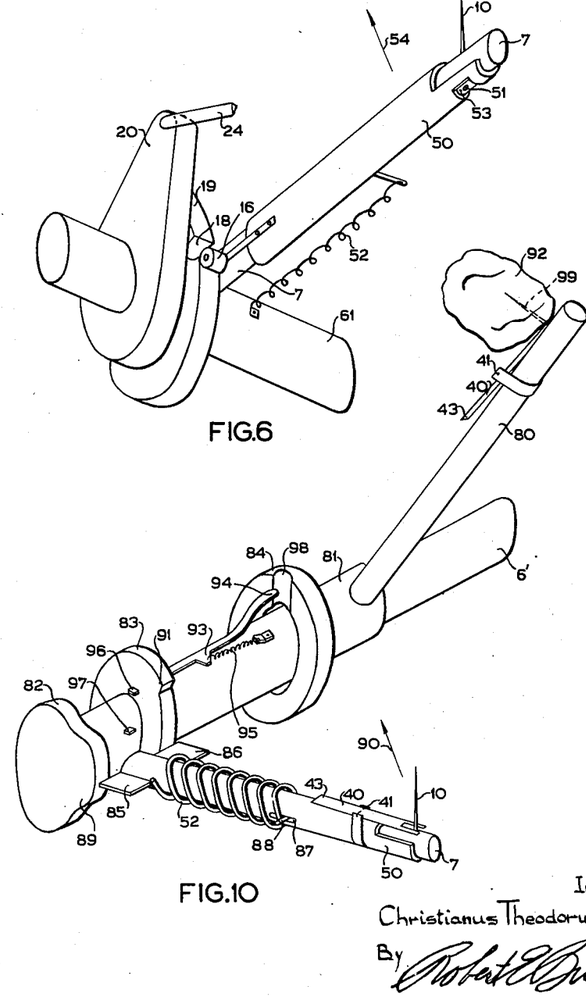
Figs. 6, 7, 8 and 9 represent parts of an improved feeler.
Figs. 10, 11 and 12 show stand-by devices, and feelers cooperating therewith.

Fig. 6 shows an improved embodiment of the feeler. The bush 19 with the arm 20 rotatable about the spindle 6' which carries the arm 7. The rod 24 actuates the stand-by device, which has not been shown, however. It may be carried out as shown in Figs. 4 and 5. A tube 50 has been slidably arranged around the arm. This tube carries the roller 16 at one of its ends. The spring 52 draws the tube 50 into the direction of the spindle 6', so that the roller 16 is pressed against the bush 19. The needle 10 is movably arranged in such manner that the foot 51 of the needle comes to lie outside the body of the arm 7 after a potato has been pinned up. The needle then enters into the opening 53 provided in the tube 50 and referred to hereinafter as the locking slot. In the position as drawn, the arm 7 has just passed the appertaining funnel, which has not been shown. If a potato is present on the needle 10, the foot of the needle has moved to the outside into the locking slot 53. Upon further rotation in the direction of the arrow 54, the roller 16 will not be able to snap into the notch 18 under the action of the spring 52, as the foot 51 of the needle lies in the locking slot 53 and thereby limits the movement of the tube 50, or even practically completely prevents such movement, if the locking slot is sufficiently narrow. Therefore, the roller 16 does not fall into the notch 18, so that the bush 19 is not taken along by the arm 7. Hence, the stand-by device does not operate. However, if no potato were pinned up on the needle 10, the foot 51 of the needle would not have moved outside of the body of the arm 7. In that case, the movement of the tube 50 is not limited by cooperation of the needle foot 51 and the locking slot 53. As soon as the arm 7 has rotated in the direction of the arrow 54 over such a distance that the roller 16 lies above the notch 18, the tube 50 will be drawn by the spring 52 into the direction of the spindle 6', and the roller 16 will snap into the notch 18. Upon further rotation of the arm 7, the bush 19 will be taken along by the roller 16, so that the stand-by device enters into operation.

The above-described construction of the feeler presents the advantage, that no small vulnerable spindles, levers and the like are required, and that all moving parts are directly accessible. This is of importance with a view to lubrication, inspection and supervision of the operation. Moreover, the assembly is very simple.

Figure 7:
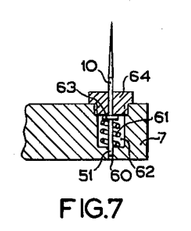
Figure 8:
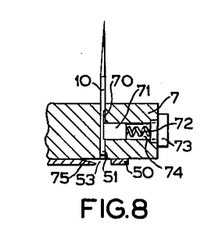
Figure 9:
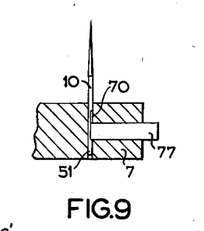

As already indicated above, the needle 10 is movably arranged in such manner that the needle foot 51 moves outside the body of the arm 7 after a potato has been pinned up. This may be attained in various manners, to which Figs. 7, 8 and 9 are devoted. In these figures, only the outside end of the arm 7 has been shown.

Fig. 7 shows how the needle may be resiliently mounted. A cylindrical cavity 62 has been provided in the arm 7, and is closed at the upper end by means of a screw stopper 64. Openings are provided in the screw stopper 64 and in the bottom of the recess 62, in which the needle 10 may slide up and down freely. A ring 63 has been arranged on the needle, or may be integral with the needle, if desired. Between this ring and the bottom of the recess 62, a spring 61 has been placed around the needle 10, which pushes the needle upwards. However, this spring is so weak that it is compressed by the force working on a potato pinned up on the needle 10, whereby the needle slides down, and the needle foot 51 moves through the opening outside the body of the arm 7. This movement of the needle must take place after the pinning-up point has been passed, if a potato has been taken along at that point, but before the feeler enters into operation. Thus, it will be clear that the force working on the potato must be opposite to and larger than the force exerted by the spring 61 on the needle 10, at least during the last part of this phase of movement of the arm 7. If use is made of gravity, care must be taken that the needle points upwards at the required moment, so that the needle may be moved down by the weight of the potato. Of course, the axis of rotation of the needle need not be exactly vertical, provided that care is taken that the component of the weight of a pinned-up potato working along the said axis is sufficient to overcome the spring pressure. It is also possible to make use of the centrifugal force working on a potato pinned up on the needle upon rotation of the arm. This force is directed to the outside. In this case, the point of the needle 10 must be closer to the spindle 6' than the needle foot 51, and the strength of the spring 61 must be chosen in such manner that the component of the centrifugal force working on a pinned-up potato in the direction of the axis of the needle is sufficient to compress the spring. When making use of the centrifugal force, the difficulty obtains that this force is dependent on the speed of rotation of the arm, i. e. of the speed of the planting machine. If this speed becomes too low, the feeler does not operate any more. However, it is very well possible to choose the minimum speed so low, for instance ½ km. per hour that no trouble is experienced in practice. If use is made of the force of gravity, as well as in making use of the centrifugal force, the spring 61 must be made so strong that the force working on the needle alone, which also occurs if no potato has been pinned up, is insufficient to overcome the spring pressure.

After passing the wiping-off point, where the potato is removed, the needle 10 will again assume the position shown in Fig. 7 by the action of the spring 61.

Fig. 8 shows how friction may be used in connection with the movement of the needle. The needle 10 is provided over part of its length with a flattening 70. It may slide in a hole provided in the arm 7, and having a sufficiently large diameter. Furthermore, a cylindrical recess 74 has been provided in the tube, which is closed by a screw stopper 73. A cylinder 71 may slide in this recess. This cylinder is pressed to the left by a spring 72, against the flat part of the flattening 70 of the needle 10. Thus, the needle in moving experiences a certain friction, dependent on the strength of the spring 72. The movement of the needle is limited by the cylinder 71, the stroke of the needle being equal to the difference between the length of the flattening 70 and the diameter of the cylinder 71. For moving the needle, a choice may be made out of three different forces, or combinations thereof, viz., the force appearing on pinning-up, the force of gravity, or the centrifugal force on the pinned-up potato. In general, the first of these forces is the largest, and it may still be increased by making the needle point dull, or by roughening the needle surface. The friction of the needle must be adjusted in such manner that the friction is overcome by one of the said forces or by a combination thereof, if a potato is or has been pinned up, whilst this may not be the case for the force or forces working on the needle per se.

Fig. 9 shows another method for obtaining the friction. The needle 10 has again been provided with a flattening 70, and cooperates with a permanently magnetized cylinder 77 clamped in the arm 7. The needle is drawn against this cylinder by the magnetic force, so that the required friction is obtained. Hence, the needle must be made of a ferromagnetic material, or a ferromagnetic armature may be attached to the needle. If the arm 7 itself is made of a permanently magnetizable material, this arm may be magnetized, and the cylinder 77 is superfluous. These various embodiments have this in common that the force working on the needle is caused by a magnetic field.

When the arm 7 has passed the wiping-off device, and the potato pinned up on the needle 10 has therefore been removed from the needle, the needle 10 must be brought back to that position, wherein the needle foot 51 lies within the body of the arm 7, before the feeler again enters into operation. With the embodiments according to Fig. 7, this happens, as stated above, by means of the spring 61. With the embodiments according to Figs. 8 and 9, however, this spring has not been provided. This may be attended to in the following manner.

In wiping off, the potato is drawn from the needle, whereby a force is exerted on the needle, which may be used to return the needle to the above-mentioned position. However, in this case the needle foot 51 must be able to move freely through the locking slot 53, so that in the meantime the tube 50 of Fig. 6 must have moved so far from the spindle 6', against the action of the spring 52, that the needle foot is free. The force occurring upon wiping off may still be increased. For this purpose, the needle must point downwards.

It is also possible, as shown in Fig. 8, to obtain the desired inward movement of the needle foot by means of a cam 75 provided at the tube 50. In that case, this tube must move so far to the right, by preference before passing the wiping-off point, that the needle foot 51 is pushed to the inside by the oblique top of the cam 75. For this purpose, the needle foot could also be provided with an oblique surface. With the embodiment shown in Fig. 6, this movement of the tube could be obtained in a simple manner by providing the outside of the bush 19 with a suitable profile. After having brought the needle foot 51 into the desired position, the tube 50 must be moved back to such an extent that the needle foot 51 is in alignment with the locking slot 53, as the needle foot 51 must be able to move outside of the body of the arm 7 and into the locking slot 53 upon the ensuing operation of the feeler, if a potato has been pinned up.

In Fig. 10 which shows an improved stand-by device, the arm 7 is attached to the spindle 6'. The arm 7 is provided with a movable needle 10 and a tube 50 has been arranged around the arm, which cooperates with the needle as in the arrangement shown in Fig. 6. The stand-by device here consists of a second rotatable arm 80, the stand-by arm. Just like the arm 7, the stand-by arm is provided with a needle 99, and with a wiping-off device 40, 41, 43 as shown in Fig. 3. The arm 80 is attached to a bush 81 which is freely rotatable about the spindle 6'. The cam discs 82 and 84 are fixedly arranged, and the cam disc 83 is connected with the bush 81. The tube 50 has two cam followers 85 and 86, cooperating with the cam discs 82 and 83. A pin 88, fixedly connected with the arm 7, extends through a slot 87 in the tube 50. Between the pin 88 and the cam followers 85, 86 a compression spring 52 is arranged, which presses the tube 50 into the direction of the spindle 6'. In the position shown, the needle 10 is just moving through the pinning-up space, which has not been shown. The cam follower 85 lies on the projection 89 of the cam disc 82, so that the cam follower 86 does not engage the cam disc 83. The foot of the needle 10, which is not visible in the figure, is in alignment with the locking slot of the tube 50.

Now, if a potato is pinned up in the pinning-up space, the needle foot will move to the outside into the locking slot. Upon further rotation of the arm 7 in the direction of the arrow 90, the cam follower 85 will leave the projection 89 of the cam disc 82. Now, the spring 52 tries to move the tube 50 in the direction of the spindle 6'. However, as the needle foot lies in the locking slot, the tube is locked, so that upon further rotation the cam follower 85 is made free from the lower part of the cam disc 82 following the projection 89. The cam disc 83 carries a tooth-shaped projecting part 91 which is so low, however that the cam follower 86 passes over this part if the tube 50 is locked, i. e. if a potato is present on the needle 10. Nothing particular happens in this case. Upon further rotation of the arm 7, the potato is wiped off as described hereinbefore. After that, the arm 7 again moves to the pinning-up space. Before this space is reached, the cam follower 85 again runs up against the projection 89, so that the tube 50 is shifted against the action of the spring 52, and the needle 10 is freely movable. The needle foot is or has been brought inside the body of the arm 7 in one of the above-described manners, and the needle is again ready to react to the presence of a potato after the pinning up space has been passed.

Assuming that no potato has been pinned up, the operation is as follows: The needle foot has not moved to the outside into the locking slot. Hence, the tube 50 has not been locked. Upon further rotation of the arm 7 in the direction of the arrow 90, the cam follower 85 will run down from the projection 89, and the tube 50 moves in the direction of the spindle 6' under the action of the spring, so that the cam follower 85 continuously runs on the cam disc. Hence, the cam follower 86 is also closer to the spindle 6', and cannot pass the tooth 91. The cam disc 83 is now coupled with the arm 7 and the spindle 6' by the cam follower 86, together with the bush 81 and the stand-by arm 80. When the arm 7 passes the wiping-off point, it cannot deliver a potato. However, at the same time the stand-by arm 80 passes the associated wiping-off point, so that the potato 92 pinned up on this arm is removed therefrom and takes the place of the potato which ought to have been present on the main arm 7. By means of suitable pipes and/or channels, it is of course possible to obtain in a simple manner that this potato 92 falls into the same sowing pipe, or on the same spot of the furrow as a potato pinned up on the main arm 7.

After having passed the wiping-off point, the stand-by arm is taken further along through an associated pinning-up space, which the stand-by arm passes at the same moment that the main arm, temporarily coupled with the stand-by arm, passes its associated pinning-up space. Now, if the main arm takes along a potato, the tube 50 will again be locked, so that the coupling between the cam follower 86 and the tooth 91 does not occur again. The stand-by arm will then be stopped in the position shown in the drawing, whilst the main arm continues to rotate. An additional mechanism has been provided for stopping the stand-by arm, which at the same time causes the stand-by arm always to remain coupled with the main arm during exactly one complete revolution. This is because the coupling 86—91 cannot serve for this purpose, since the cam follower 85 runs over the projection 89 during part of the revolution of the main arm 7, whereby the coupling between the parts 91 and 86 is interrupted. This is why an auxiliary coupling is required. This mechanism will now be described.

A rod 93 is slidable on the tube 81 in parallel to the spindle 6'. This rod is drawn to the right (as shown in the drawing) by a spring 95, so that its end 94 runs along the front side of the cam disc 84. At the other end 96, the rod 93 has been led through the cam disc 83 so as to extend beyond this disc over a small distance. If the stand-by arm stands still, the end 94 of the rod 93 lies in the recess 98 of the cam disc 84. A block 97 is keyed to the spindle 6'. If a potato is present on the main arm 7, so that the cam follower 86 passes the tooth 91, the block 97 also just passes the end 96 of the rod 93. However, if no potato is present on the main arm, the cam follower 86 will take along the tooth 91, so that the bush 81 starts to rotate. Hence, the end 94 of the rod 93 is pressed into the recess 98, so that the rod 93 is moved to the left against the action of the spring 95. The end 96 also moves to the left, so that the block 97 cannot pass this end any more. This condition is maintained during a complete revolution. Upon the interruption of the coupling between the tooth 91 and the cam follower 86, caused by the cam follower 85 passing over the projection 89, the block 97 will now take along the rod 93, together with the bush 81 and the stand-by arm, until the latter again reaches the position shown in the drawing. At that moment, the end 94 snaps into the recess 98, whereby the auxiliary coupling 96—97 is interrupted. The stand-by arm has now made exactly one revolution. If a potato is present on the main arm, the tooth 91 will not be taken along by the cam follower 86. By taking care that the friction experienced by the stand-by arm upon rotation due to the end 93 running up against the back side of the recess 98 is greater than the friction between the bush 81 and the spindle 6', it is obtained that the stand-by arm 80 will be stopped in the position shown in the drawing, together with the bush 81 and the cam disc 83. However, if no potato is present on the main arm 7, the tooth 91 is taken along by the cam follower 86, and the stand-by arm 90 again rotates together with the arm 7 and the spindle 6' during one revolution, as described hereinbefore. For the rest, it will be clear that the same effect may be obtained by making the auxiliary coupling 96—97 only operative during that part of the revolution of the main arm, wherein the cam follower 85 lies on the projection 89.

In comparison with other possible forms of construction of the stand-by device, it is an advantage of the described embodiment that the device has the shape of a second rotatable arm. This is because the arms 7 and 80 may be constructed without any objection in the same manner, whereby the number of different parts is limited. Moreover, it has turned out that the above-described embodiment works better than other embodiments, in particular better than the embodiment described with reference to Figs. 4 and 5.

If the main arm misses once, the stand-by arm automatically becomes operative. It delivers one potato, and after that in the above-described embodiment, it rotates once through the associated pinning-up space. Of course, it is conceivable that the stand-by arm does not take along a potato during this single revolution. In that case, it is stopped, and upon the next failure of the main arm it will be taken along, but will not be able to deliver a potato. Thus, none of the arms delivers a potato and the machine skips one planting hole. Although this condition will occur relatively rarely (much less often than a failure of the main arm), it may still be undesired under certain circumstances. In any case, it means a reduction of the harvest, although this reduction may be a small one. In laying out test-plots, it may happen that one wants to be practically certain that no planting holes are skipped. With reference to the next two embodiments, it will be shown hereinafter how the potato planting machine may be further perfected to such extent that a failure is practically out of the question.

Figure 11:
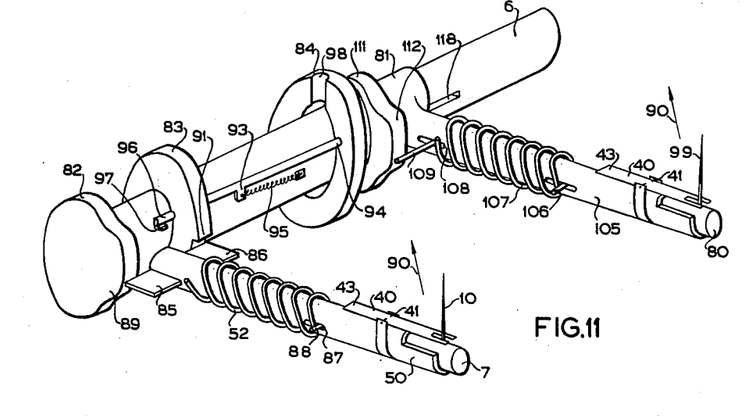

Fig. 11 shows an embodiment, wherein many parts are identical with those shown in Fig. 10. These parts have been indicated by the same reference numerals. The function of these parts is also the same. However, the arm 80 is not fixedly connected with the bush 81 in this embodiment, but it is slidable in a tube 105 connected with the bush 81. This tube is provided at its right-hand end with a locking slot, which is not visible in the drawing. The needle 99 is movably arranged. This needle 99 forms, together with the tube 105 and the arm 80 a feeler, appertaining to the stand-by arm 80. This feeler has the object to establish whether a potato is present on the needle 99. A slot 108 is provided in the tube 105. A pin-shaped cam follower 109, extending through this slot, is fixedly connected with the slidably arranged arm 80. The pin 106 is fixedly connected with the tube 105. Between the pin 106 and the cam follower 109, a compression spring 107 is provided, which presses the arm 80 in the direction of the spindle 6'. This spindle is provided with a key groove 110. The arm 80 is wedge-shaped at the end facing the spindle 6', the flat end of the wedge being parallel to the spindle 6' and fitting in the key groove 110. The cam follower 109 cooperates with the fixedly arranged cam disc 111, which is provided with a projection 112, and corresponds to the fixedly arranged cam disc 82.

As the part to the left of the cam disc 111 completely corresponds with Fig. 10, it will be clear that on a failure of the arm 7, the arm 80 is again taken along during one revolution, as fully described hereinbefore. Now, the arms have been drawn in the position they have on the moment on which they both pass the associated pinning-up spaces. Hence, both needles are empty. If the main arm 7 does not pick up a potato, the stand-by arm 80 will be taken along during the next complete revolution by the action of the couplings 86—91 and 96—97, in the same manner as described with reference to Fig. 10.

If the main arm does pick up a potato, the couplings 86—91 and 96—97 become inoperative, as described hereinbefore. In that case, there are two possibilities, depending on whether the stand-by arm has or has not picked up a potato.

If a potato has been picked up, the foot of the needle 99 moves into the locking slot of the tube 105, which is in alignment with this needle foot in the position shown in the drawing. Thus, the arm 80 and the tube 105 are locked together, and when the cam follower 109 has left the projection 112 of the cam disc 111, the arm 80 cannot move in the direction of the spindle 6', in spite of the action of the spring 107. That is why the wedge-shaped inside end of the arm 80 does not snap into the key-groove 110, so that nothing particular happens, and the arm 80 is stopped in the position, in which the end 94 of the rod 93 snaps into the recess 98 of the cam disc 84, just as in Fig. 10.

If the stand-by arm does not pick up a potato, the foot of the needle 99 remains inside the body of the arm 80, and no locking between the arm 80 and the tube 105 is obtained. When the cam follower 109 leaves the projection 112 the arm 80 performs a movement in the direction of the spindle 6' by the action of the spring 107. Hence, the wedge-shaped left-hand end of the arm 80, which of course is invisible in the figure, falls into the key groove 110. The stand-by arm thereby remains coupled with the spindle 6' if this arm does not pick up a potato, in spite of the inoperativeness of the couplings 86—91 and 96—97 in the position, in which the stand-by arm stopped in Fig. 10. The stand-by arm is therefore taken along beyond this point, and once this has happened, the coupling 96—97 again enters into operation as indicated in Fig. 10. This coupling takes care that the stand-by arm is taken along for a complete revolution, also if the coupling 86—91 has not been effected due to the presence of a potato on the main arm, and in spite of the falling out of the coupling between the wedge-shaped end of the arm 80 and the key-groove 110 during the time, wherein the cam follower 109 slides along the projection 112. The consequence is that the stand-by arm will rotate together with the spindle 6' as long as it does not pick up a potato, and that it will be stopped only if both the main arm and the stand-by arm have picked up a potato. Then, the coupling 86—91 falls out at the moment that the end 94 has reached the recess 98, and as the couplings 86—91 and 80—110 are already inoperative, because the potatoes present on the main arm and the stand-by arm have brought about the locking of the tube 50 and the arm 80, the stand-by arm is stopped.

Upon a subsequent failure of the main arm, it is practically certain that a potato is present on the stand-by arm. Thus, the machine fails only when the stand-by arm does not succeed in picking up a potato between two subsequent failures of the main arm. The number of revolutions of the main arm between two successive failures thereof is so great in practice, however, and the chance that the stand-by arm does not pick up a potato during all these revolutions is so small, that this possibility need not be taken into account at all, as it has such an exceedingly small probability.

It will be clear that the function of the wedge-shaped left-hand end of the arm 80 together with the key groove 110 is equal to that of the cam 86 together with the cam disc 83. The key groove 110 with the adjoining part of the spindle may also be considered as a cam disc rotating together with the spindle 6', which is accidentally integral with the spindle 6'.

The feeler associated with the stand-by arm 80 may also be carried out with advantage in another manner, for instance as described hereinbefore for the feeler of the main arm according to Figs. 6, 7, 8 and 9, or as described for the feeler of the embodiment of Figs. 1–5.

Figure 12:
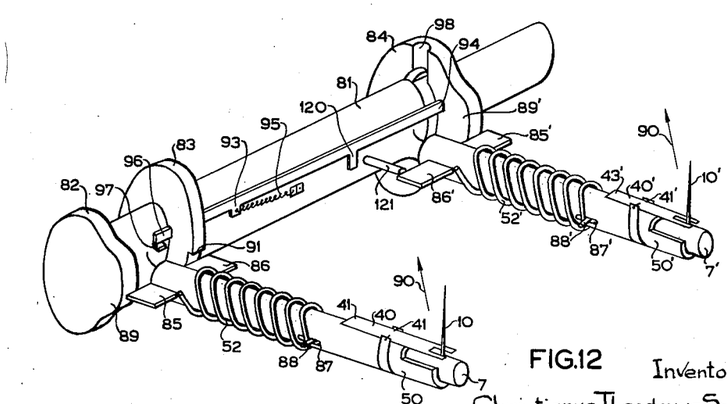

In the preferred embodiment shown in Fig. 12, the main arm and the stand-by arm are completely identical, whereas the feelers are also practically identical. Of course, this is of importance, as it leads to a certain standardization of the parts to be produced in manufacture, of the assembly, and of the stock of spare parts to be formed. This principle may also be applied with advantage to the parts cooperating with the arms, such as the pinning-up space (funnel) and the wiping-off device which are substantially equally constructed in that case.

The parts in Fig. 12 that are identical with those of Fig. 11 have been indicated by the same reference numerals. The parts of the stand-by arm in Fig. 12 have been indicated by reference numerals corresponding with those of the corresponding parts of the main arm, but provided with an accent (').

In the embodiment according to Fig. 12, the cam disc 84 has been arranged more to the right and has been profiled at the outside, so that it performs at the same time the function of the cam discs 84 and 111 of Fig. 11.

Both arms have been drawn in the same position as in Fig. 11. The part of the figure to the left of the arm 7' fully corresponds with that of Figs. 10 and 11. Thus, the stand-by arm 7' will be taken along for one revolution by the spindle 6', as fully described hereinbefore. If, in the embodiment of Fig. 10 the main arm did pick up a potato, the stand-by arm was stopped due to the falling out of the coupling 96—97 at the moment that the end 94 of the rod 93 passed the recess 98, as the coupling 86—91 had already fallen out. In Fig. 11, a third coupling (80—110) became operative at this moment, whereby the stand-by arm was taken further along, until it had also picked up a potato, so that the third coupling became inoperative. Here, the taking along of the stand-by arm until it has picked up a potato is realized in another manner.

If the stand-by arm 7' picks up a potato, the needle 10' is pushed in, so that the foot of this needle enters into the locking-slot of the tube 50' and this tube is locked. Now, the cam follower 86' of this tube is provided with an extension 121, cooperating with the projection 120 of the rod 93. If the tube 50' is locked, the extension 121 does not prevent the displacement of the rod 93, as the projection 120 can slide just between the bush 81 and the side of the extension 121 facing that bush. Just as in Fig. 10, the coupling 96—97 falls out when the end 94 passes the recess 98. If a potato is present on the main arm, the tube 50 is locked thereby, and the coupling 86—91 is inoperative. The stand-by arm will then stand still, just as in Fig. 10. If no potato is present on the main arm 7, the coupling 86—91 continues to exist and the stand-by arm will now continue to rotate, and delivers a potato, as in Fig. 10.

However, if the stand-by arm does not pick up a potato, the tube 50' is not locked, and this tube will make a movement towards the spindle 6' under the action of the spring 52' when the cam follower 85' leaves the projection 89'. Hence, the extension 121 of the cam follower 86' comes to lie on the outside of the bush 81. When the end 94 now passes the recess 98, the rod 93 will not be able to move to the right under the action of the spring 95, as the projection 120 cannot pass the extension 121 lying on the outside of the bush. Thus, the auxiliary coupling 96—97 is locked in its operative position by the extension 121, so that the stand-by arm 7' will be taken along by the spindle 6'. The auxiliary coupling is unlocked only when the stand-by arm 7' has picked up a potato, whereby the tube 50' is locked and the extension 121 remains raised from the outer surface of the bush 81.

Just as in Fig. 11, the main arm rotates continuously. The stand-by arm rotates along until it has picked up a potato, and is then stopped in the position in which the end 94 lies in the recess 98. If the main arm fails to pick up a potato, the stand-by arm starts to rotate together with the main arm and delivers a potato instead of the main arm. After that, it rotates along with the main arm until it has picked up a potato, and then remains standing until the main arm again fails to pick up a potato.

I claim:

1. A potato planting machine, comprising a storage tank for seed-potatoes, a pinning-up space, feeding means for supplying said seed-potatoes from said storage tank to said pinning-up space, at least one rotatable arm, a needle attached to the end of said arm, pointing in the direction of rotation thereof and passing through said pinning-up space upon rotation of said arm so as to pin up and to take along a potato, a wiping-off device permanently arranged in the path of said needle and adapted to wipe off a pinned-up potato, a feeler for detecting the absence of a potato on said needle after the same has passed said pinning-up space, and a stand-by device controlled by said feeler for delivering a potato in the absence of a potato on said needle.

2. A potato planting machine, comprising a storage tank for seed-potatoes, at least one arm rotatable in a vertical plane, a needle attached to the end of said arm and pointing in the direction of rotation thereof, a funnel placed in a vertical position so that the axis of said funnel touches the path of said needle and provided with a slot for passing said needle, feeding means for supplying said seed-potatoes from said storage tank to said funnel, a wiping-off device permanently arranged in such manner as to pass through said funnel upon rotation of said arm so as to pin up and to take along a potato, said wiping-off device being adapted to wipe off a pinned-up potato, and a feeler for detecting the absence of a potato on said needle after the same has passed said funnel, a sliding member placed underneath said opening in its zero position, an operating arm for said sliding member, and coupling means controlled by said feeler for temporarily coupling said operating arm with said rotatable arm.

3. A potato planting machine, comprising a storage tank for seed-potatoes, at least one arm rotatable in a vertical plane, a needle attached to the end of said arm and pointing in the direction of rotation thereof, a funnel placed in a vertical position so that the axis of said funnel touches the path of said needle and provided with a slot for passing said needle, feeding means for supplying said seed-potatoes from said storage tank to said funnel, a wiping-off device permanently arranged in such manner as to pass through said funnel upon rotation of said arm so as to pin up and to take along a potato, said wiping-off device being adapted to wipe off a pinned-up potato, and a feeler for detecting the absence of a potato on said needle after the same has passed said funnel, a sliding member placed underneath said opening in its zero position, an operating arm for said sliding member, and coupling means controlled by said feeler for temporarily coupling said operating arm with said rotatable arm and an actuating rod for said coupling means, wherein the said feeler is formed as a lever adapted to lock said actuating rod when a potato has been pinned up on said needle.

4. A potato planting machine as claimed in claim 3, further comprising a shaft for rotating said rotatable arm, a bush freely arranged on said shaft, and a roller provided at the end of said actuating rod, and running over said bush, the said bush being provided with a notch, and the said roller being adapted to snap into said notch in the unlocked condition of said actuating rod so as to form a coupling between said rotatable arm and said bush.

5. A potato planting machine as claimed in claim 4, further comprising means for arresting the said sliding member in its operative position until the said roller has run out of said notch, and a spring for drawing back the said sliding member and the said bush in their zero positions.

6. A potato planting machine, comprising a storage tank for seed-potatoes, at least one arm rotatable in a vertical plane, a needle attached to the end of said arm and pointing in the direction of rotation thereof, a funnel placed in a vertical position so that the axis of said funnel touches the path of said needle and provided with a slot for passing said needle, feeding means for supplying said seed-potatoes from said storage tank to said funnel, a wiping-off device permanently arranged in such manner as to pass through said funnel upon rotation of said arm so as to pin up and to take along a potato, said wiping-off device being adapted to wipe off a pinned-up potato, and a feeler for detecting the absence of a potato on said needle after the same has passed said funnel, a sliding member placed underneath said opening in its zero position, a sowing pipe, an operating arm for said sliding member, and coupling means controlled by said feeler for temporarily coupling said operating arm with said rotatable arm, and an inlet mouthpiece for said sowing pipe, the said sliding member being formed as a ring movable from a zero position underneath said opening to an operating position above said sowing pipe, said mouthpiece extending under the said sliding member in its zero position so as to form a bottom for said ring.

7. A potato planting machine, comprising a storage tank for seed-potatoes, at least one arm rotatable in a vertical plane, a needle attached to the end of said arm and pointing in the direction of rotation thereof, a funnel placed in a vertical position so that the axis of said funnel touches the path of said needle and provided with a slot for passing said needle, feeding means for supplying said seed-potatoes from said storage tank to said funnel, a wiping-off device permanently arranged in such manner as to pass through said funnel upon rotation of said arm so as to pin up and to take along a potato, said wiping-off device being adapted to wipe off a pinned-up potato, and a feeler for detecting the absence of a potato on said needle after the same has passed said funnel, a sliding member placed underneath said opening in its zero position, an operating arm for said sliding member, and coupling means controlled by said feeler for temporarily coupling said operating arm with said rotatable arm, and operating means connected with said feeler for actuating said coupling means, wherein the said rotatable arm is provided with a cavity, and the said feeler and the said operating means are arranged in said cavity.

8. A potato planting machine, comprising a storage tank for seed-potatoes, a pinning-up space, feeding means for supplying said seed-potatoes from said storage tank to said pinning-up space, at least one rotatable arm, a needle attached to the end of said arm, pointing in the direction of rotation thereof and passing through said pinning up space upon rotation of said arm so as to pin up and to take along a potato, a wiping-off device permanently arranged in the path of said needle and adapted to wipe off a pinned-up potato, a feeler for detecting the absence of a potato on said needle after the same has passed said pinning-up space, and a stand-by device controlled by said feeler for delivering a potato in the absence of a potato on said needle, the said feeler comprising a tube enclosing the said rotatable arm and slidable along said arm.

9. A potato planting machine as claimed in claim 8, wherein the said needle is movably arranged in such manner that the foot of the needle moves outside the body of the said rotatable arm when a potato is pinned up on said needle so as to serve as a stop member for limiting the movement of said tube.

10. A potato planting machine as claimed in claim 9, further comprising a spring acting to keep said tube in a predetermined position with respect to said arm, and means for displacing said tube from said position against the action of said spring before said arm passes said pinning-up space and for keeping the tube so displaced as said arm passes said pinning-up space.

11. A potato planting machine as claimed in claim 10, wherein the said means for displacing the tube are operative before the said arm reaches the said wiping-off device.

12. A potato planting machine as claimed in claim 9, further comprising resilient means acting to keep the foot of the said needle inside the body of said arm.

13. A potato planting machine as claimed in claim 9, wherein the said needle is movable in a longitudinal direction with such a friction as to be only displaced by the pinning-up of a potato.

14. A potato planting machine as claimed in claim 11, wherein the said wiping-off device is arranged in such a position that the said needle points downward in passing the said device.

15. A potato planting machine as claimed in claim 13, further comprising means for exerting a magnetic force substantially perpendicular to the longitudinal axis of said needle.

16. A potato planting machine, comprising a storage tank for seed-potatoes, a pinning-up space, feeding means for supplying said seed-potatoes from said storage tank to said pinning-up space, at least one rotatable arm, a needle attached to the end of said arm, pointing in the direction of rotation thereof and passing through said pinning up space upon rotation of said arm so as to pin up and to take along a potato, a wiping-off device permanently arranged in the path of said needle and adapted to wipe off a pinned-up potato, a feeler for detecting the absence of a potato on said needle after the same has passed said pinning-up space, and a stand-by device controlled by said feeler for delivering a potato in the absence of a potato on said needle, said stand-by device comprising a second rotatable arm, a second needle attached to the end of said second arm and pointing in the direction of rotation thereof, and means controlled by said feeler for coupling said second arm with said first-mentioned arm during at least one complete revolution in the absence of a potato on said first-mentioned needle.

17. A potato planting machine as claimed in claim 16, further comprising a second feeler for detecting the absence of a potato on said second needle, and means controlled by said second feeler for keeping the said second arm coupled with the said first-mentioned arm until a potato has been pinned up on said second needle.

18. A potato planting machine as claimed in claim 17, further comprising an operating rod for actuating the said means keeping the said second arm coupled with the said first-mentioned arm, the said second feeler being formed as a lever locking the said operating rod when a potato is pinned up on said second needle.

19. A potato planting machine as claimed in claim 17, wherein the said second arm is provided with a cavity, and wherein the said second feeler is arranged in said cavity.

20. A potato planting machine as claimed in claim 17, wherein the said second feeler and the said second needle are substantially identical with the said first-mentioned feeler and the said first-mentioned needle.

21. A potato planting machine as claimed in claim 16, further comprising a second pinning-up space and a second wiping-off device, both associated with said second arm, and substantially identical with the said first-mentioned pinning up space and wiping-off device.

22. A potato planting machine as claimed in claim 16, wherein the said feeler comprises a tube slidably enclosing said first-mentioned arm and provided with two cams, further comprising a first cam disc cooperating with one of the said cams, fixedly and concentrically arranged around the common axis of rotation of the said first-mentioned and the said second arm, and adapted to displace said tube with respect to said first-mentioned arm, a second cam disc cooperating with the other one of the said cams, fixedly connected with said second arm and adapted to be carried along by said other cam upon the return movement of said tube in the absence of a potato on said first-mentioned needle, and auxiliary coupling means for coupling the said first-mentioned and the said second arm during that part of the revolution of said first-mentioned arm wherein said tube is displaced, the second arm being stopped by friction if not coupled with the said first-mentioned arm.

23. A potato planting machine as claimed in claim 17, wherein the said second feeler comprises a tube provided with two cams, further comprising a driving shaft for said first-mentioned arm, around which the said tube is rotatable, a first cam disc cooperating with one of the said cams, fixedly and concentrically arranged around the common axis of rotation of the said first-mentioned and the said second arm and adapted to displace said second arm with respect to said tube, a second cam disc cooperating with the other one of the said cams, fixedly connected with said first-mentioned arm and adapted to take along the said other cam upon the return movement of said second arm in the absence of a potato on said second needle so as to take along said second arm, and auxiliary coupling means between said first-mentioned and said second arm, the said second arm being displaced during the operation of the said auxiliary coupling means.

24. A potato planting machine as claimed in claim 22, further comprising a second feeler for detecting the absence of a potato on said second needle, the said auxiliary coupling means being locked by said second feeler in the absence of a potato on said second needle so as to keep said second arm coupled with said first-mentioned arm until a potato has been pinned up on said second needle.

CHRISTIANUS THEODORUS SMITS.

REFERENCES CITED

The following references are of record in the file of this patent:

UNITED STATES PATENTS

| Number | Name | Date |
|---|---|---|
| 1,843,229 | Hist | Feb. 2, 1932 |
| 2,161,342 | Francis | June 6, 1939 |